Oct. 17, 1967     E. P. BULLARD III     3,346,961
PROGRAM CONTROL

Filed Aug. 18, 1965     6 Sheets-Sheet 1

INVENTOR.
EDWARD P. BULLARD III
BY
ATTORNEY.

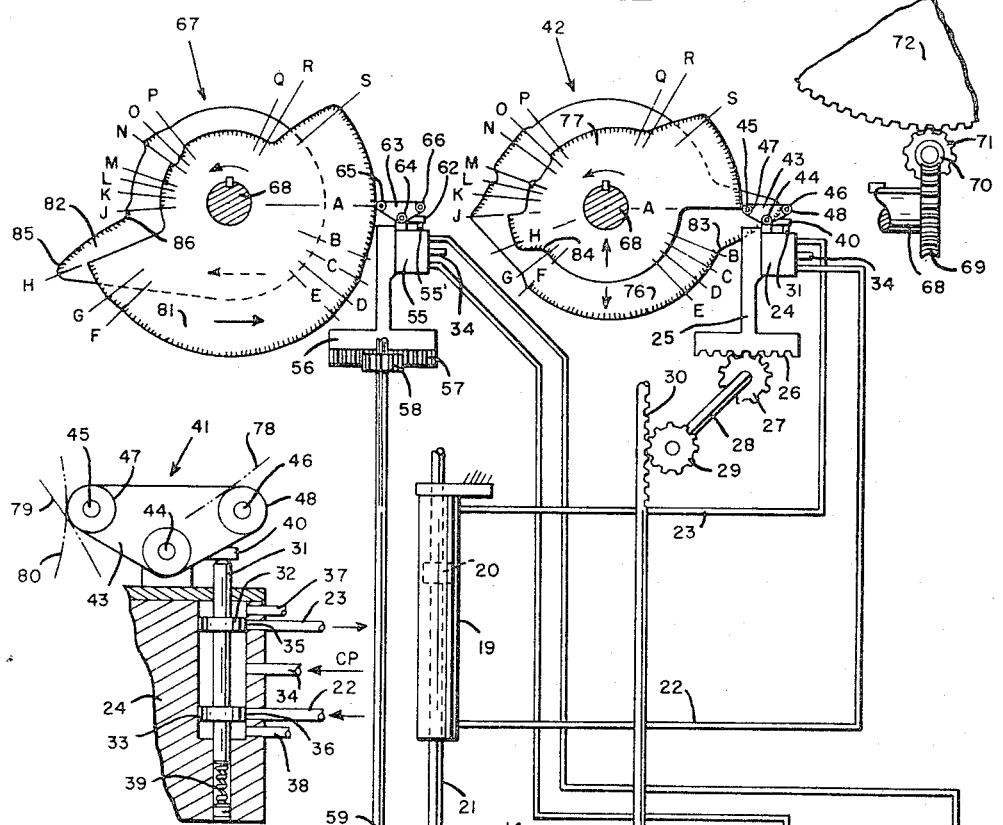
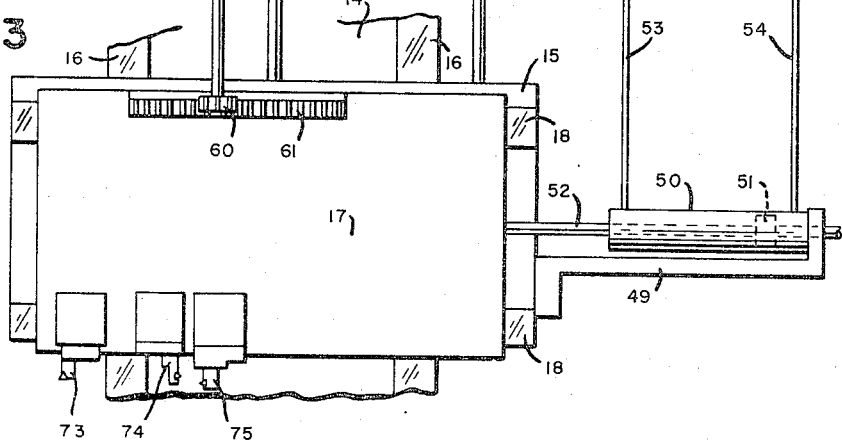

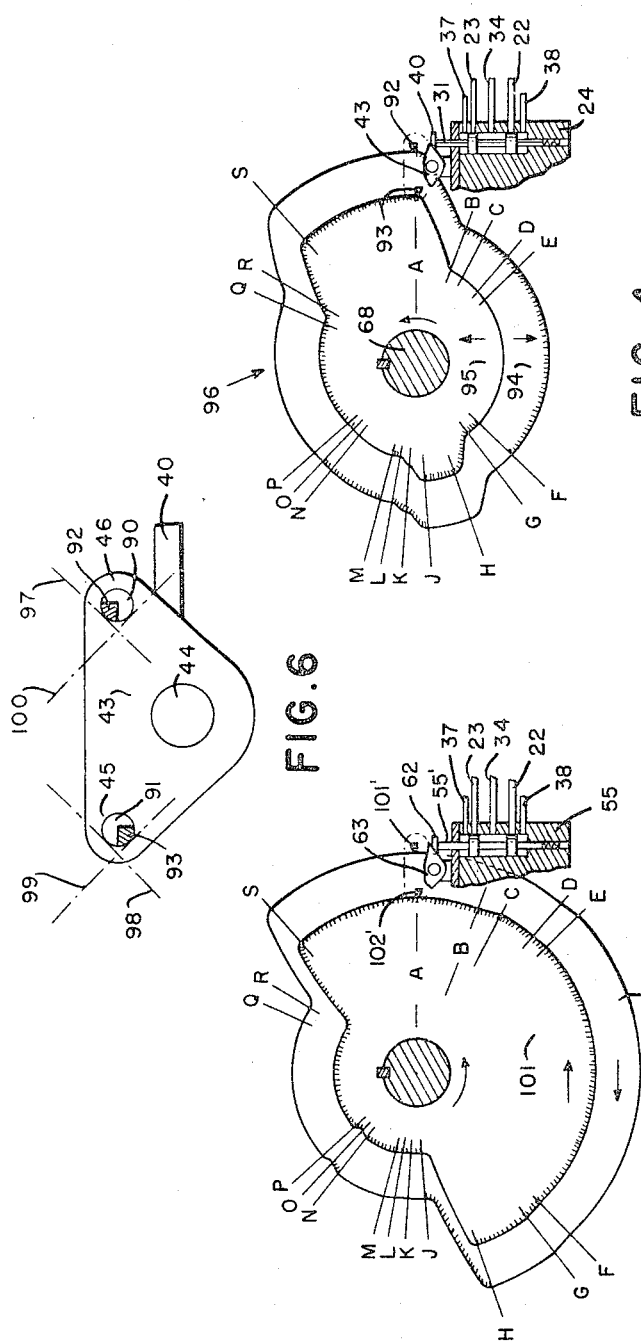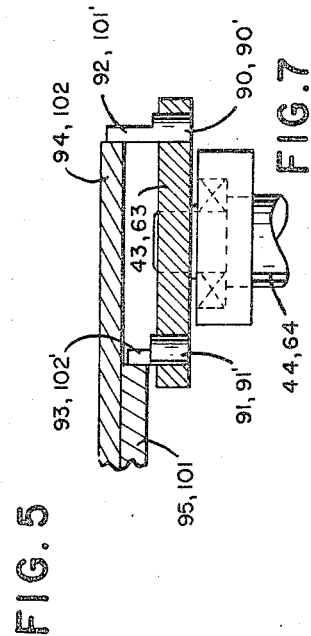

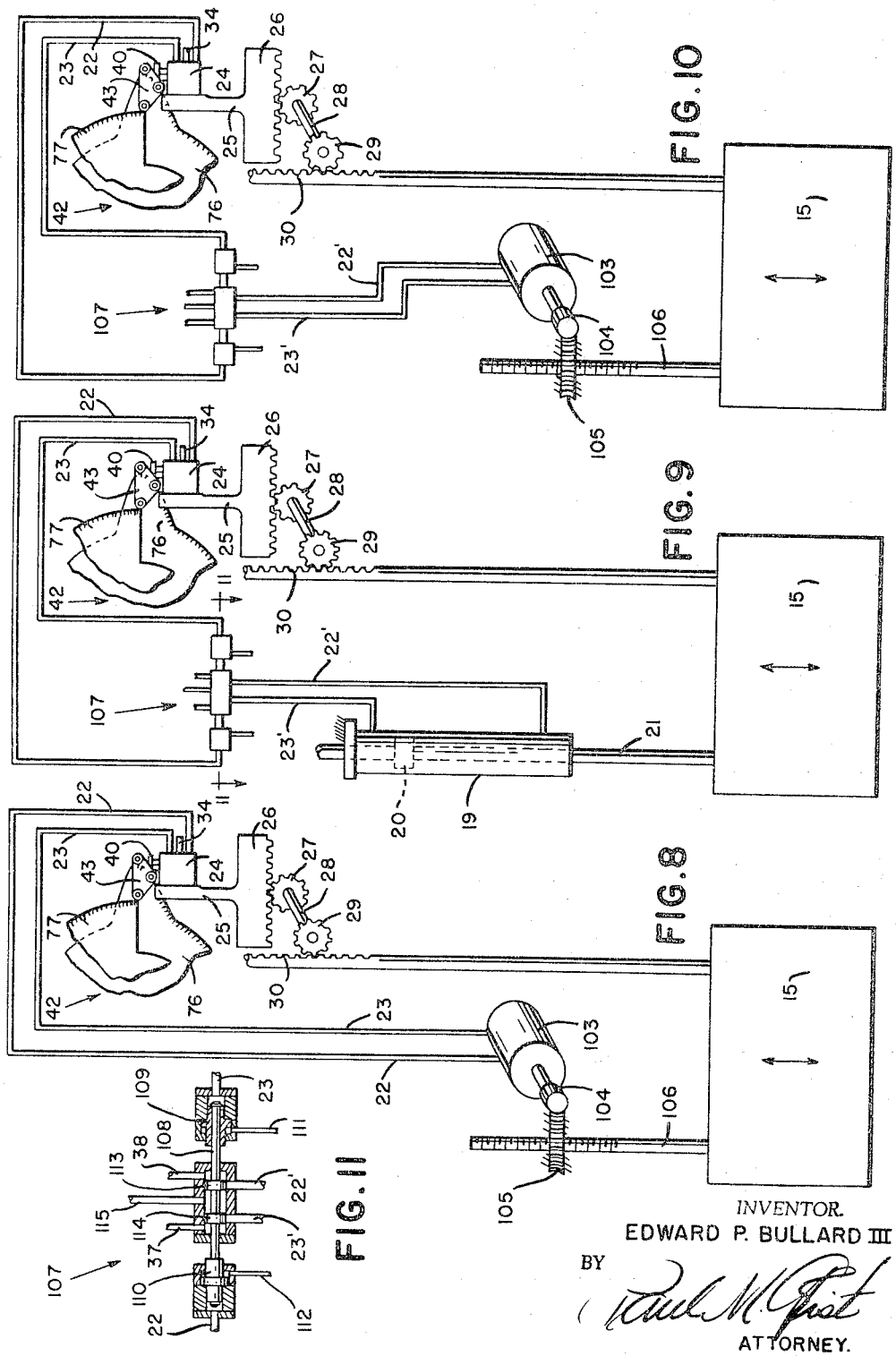

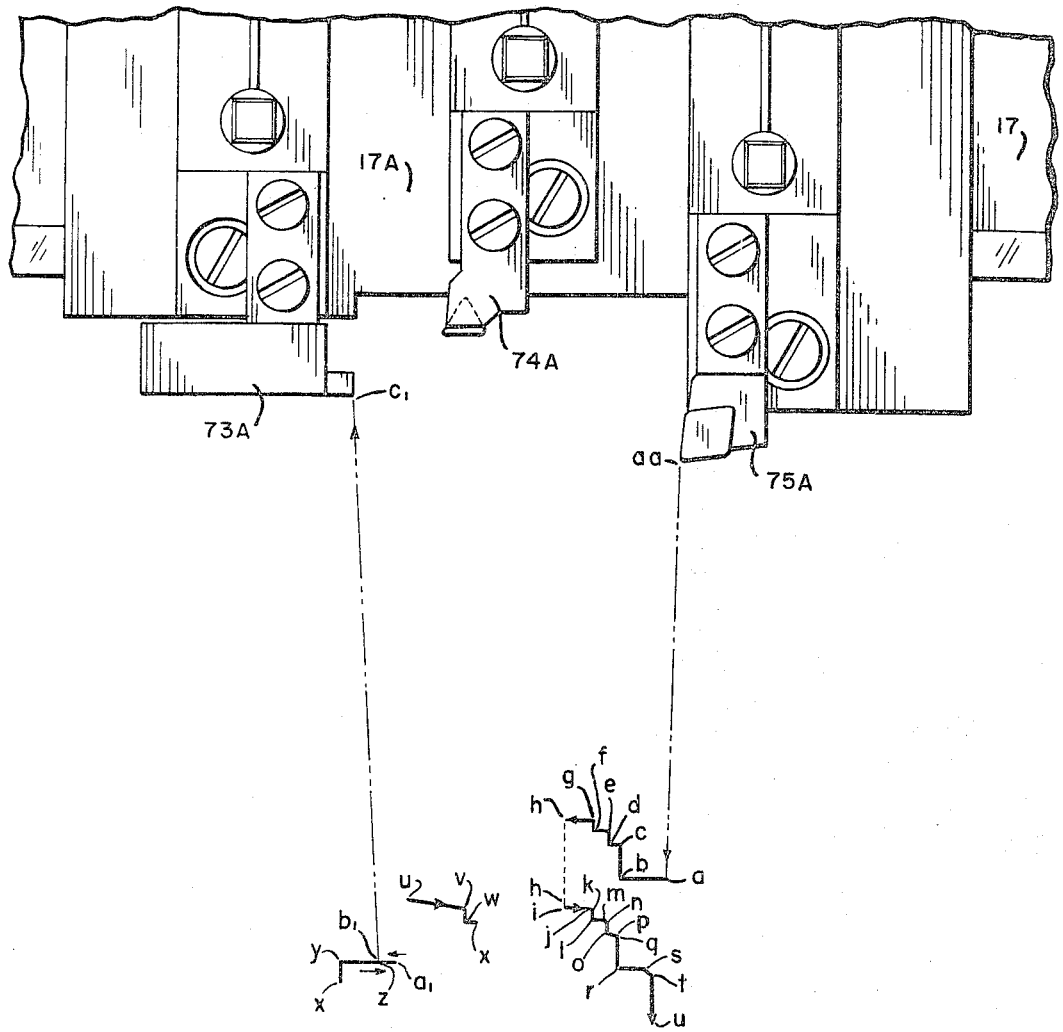
FIG. 12
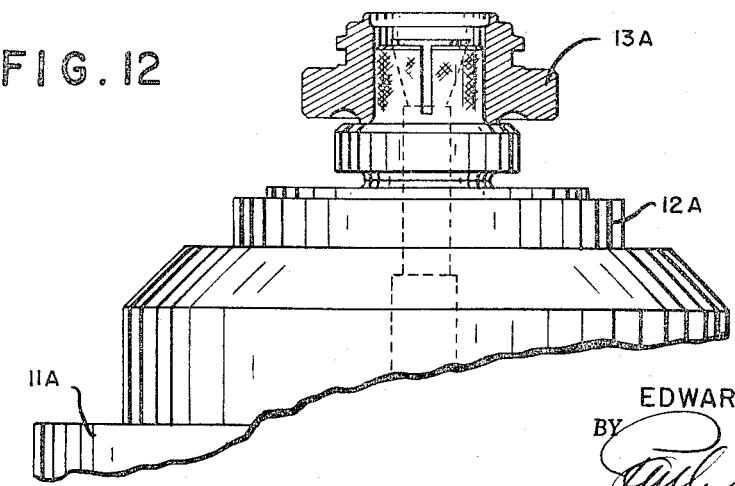

United States Patent Office 3,346,961
Patented Oct. 17, 1967

3,346,961
PROGRAM CONTROL
Edward P. Bullard III, Fairfield, Conn., assignor to The Bullard Company, Bridgeport, Conn., a corporation of Connecticut
Filed Aug. 18, 1965, Ser. No. 480,748
4 Claims. (Cl. 33—18)

This invention relates to machine tools, and particularly to an improved program control for causing one or more tools to be moved through a cycle of operations in performing work.

This application is a continuation-in-part of application Ser. No. 354,631, filed Mar. 25, 1964, now Patent No. 3,238,621.

There are prior art devices in which a member is moved along intersecting axes by a separate cam for each axis, which cams are rotated as a unit to cause the member to be moved through a cycle of operations. These devices, however, employ a rigid linkage between the movable member and the cam follower so that the power required to move the movable member and the accuracy of its movement are both developed by the cam itself. Furthermore, the maximum angle or slope of the contour on the cam edge cannot exceed 45° without the forces becoming excessive. This, therefore, requires an excessively large diameter cam for any reasonable cycle of operations, and if it is kept small by using multiplying linkage between it and the movable member, the resulting error is correspondingly increased.

In such prior known devices, peripheral, open-edge cams are employed. This requires a force always acting to maintain the follower on the cam periphery, which force must be in excess of required material cutting forces so that cutting can occur with the member moving in one direction, i.e., with the cam follower moving toward the axis of rotation of the cam. This, therefore, requires the cam to effect at least twice as much force to produce a cut with the member moving in the opposite direction.

Various template arrangements have heretofore been provided for causing tools to follow predetermined paths of travel in machining work. Thus, contouring in the machine tool field often involved a stylus following a template having a desired contour to control the movement of a tool holder to machine a workpiece to the desired shape. The design of available tracer heads, for two-dimensional contouring, for example, comprises two inductive bridges which are positioned mechanically 90° relative to each other. When the stylus is undeflected (in a null position), both bridges are balanced and there is no output from the tracer head. Upon deflecting the stylus from its null position, each bridge produces an A.C. signal which is proportional to the magnitude of the deflection along the corresponding mechanical axis. As the deflection passes through zero and is reversed, the phase of the signal reverses. Thus, the output of each bridge is an indication of the direction and magnitude of the component of deflection along the corresponding mechanical axis.

There is, however, a circular area about the null position of the stylus that is a "dead band," and deflections of the stylus must exceed the radius of this area to render the control effective. This area provides an inherent source of error that reflects in the work being produced since the deflection of the stylus by the template will vary in accordance with many factors including friction, surface speed and template shape.

Known program controls of the above described type have limited capabilities in that they cannot produce sharp corner contours, re-entrant angle contours as well as many other contours that are demanded in industry.

The principal object of this invention is to provide a program control for a movable tool support of a machine tool which will have the capability of producing any desired contour on work, regardless of shape.

Another object of the invention is to provide such a control that eliminates the inherent inaccuracies present in prior known tracer control devices.

Still another object of the invention is to provide such a control in which the pressure between a servo-follower and a template surface is independent of the forces required to produce the desired machining, and is of a substantially low value.

A still further object of the invention is to provide such a control in which separate servo means act on separate templates for controlling the movement of the tool slide along separate axes, and in which successive points along the contours of the separate templates effect, through servo and feedback means, and instantaneous displacements of the tool slide along the corresponding axes.

Another object of the invention is to provide such a control in which the templates are locked together and rotated through 360° relative to the servo means to produce a complete cycle of operations. In this way, each succeeding point about the peripheral edges of the locked templates combines the coordinates of each axis corresponding to that point, providing a resultant displacement of the tool slide in accordance with the contour to be produced.

Although the principles of the invention are equally applicable to any number axis system, it will, for clarity, be described in relation to a two-axis system.

In one aspect of the invention, a work holder may be provided for supporting work desired to be machined in accordance with a desired contour. The work support may be rotatable or non-rotatable. A member, stationary relative to the work support, may be located in position such that it can slidingly support a saddle for movement along an axis relative to the work support.

In another aspect of the invention, a tool slide may be mounted on the saddle for linear movement at right angles to the axis of movement of the saddle, and a tool or tools may be mounted on the tool slide for operating on work held by the work support. Accordingly, the tool slide is capable of universal movement within a plane. If the work support is non-rotatable, then the tools may be rotatable and vice versa.

In another aspect of the invention, fluid-operated means may be located between the stationary member and the saddle for reciprocating the latter along its axis of motion. Separate fluid-operated means may be provided between the saddle and tool slide for reciprocating the slide along its axis of movement which is at right angles to the axis of movement of the saddle. Pressure fluid is adapted to be supplied selectively to the fluid-operated means for moving the saddle and slide along their respective axes.

In another aspect of the invention, separate servo means may be employed to control the selective flow of pressure fluid to each of the fluid-operated means, and each servo means may be operated by a separate rotatable template means.

In still another aspect of the invention, the coordinates of the template means for each axis of movement of the universally movable slide are proportional to the corresponding axis coordinates of the desired path of movement of the slide for the contour desired to be produced.

In a still further aspect of the invention, the separate template means are rigidly fixed relative to each other and are rotated through a predetermined angle, usually 360°, in producing the cycle of operations of the tool slide.

In still another aspect of the invention, the servo means may comprise a transducer having means that is always displaced axially by the template means and which involves no lost motion.

In a still further aspect of the invention, there is provided composite template means for each axis of movement of the tool slide in which separate components of each composite template means controls the motion of the tool slide in one direction along the corresponding axis.

The above, other objects and novel features of the invention will become apparent from the following specification and accompanying drawings which are merely exemplary.

In the drawings:

FIG. 2 is a view similar to FIG. 1, showing additional parts of the machine tool to which the principles of the invention have been applied;

FIG. 3 is a view, partly in section, of the valve body of FIG. 2;

Figure 1:
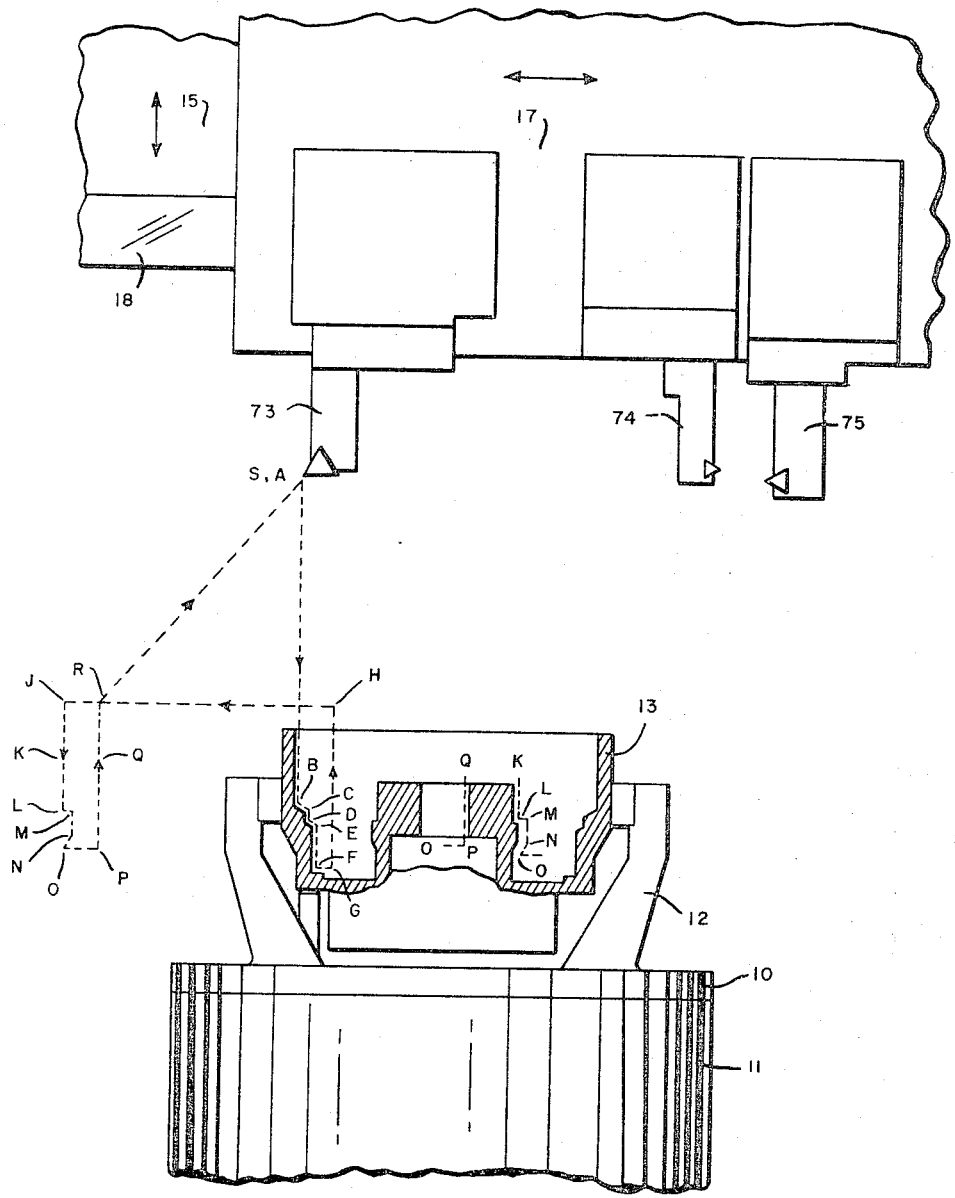
FIG. 1 is a front elevational view of certain parts of a machine tool to which the principles of the invention have been applied.
Figure 13:
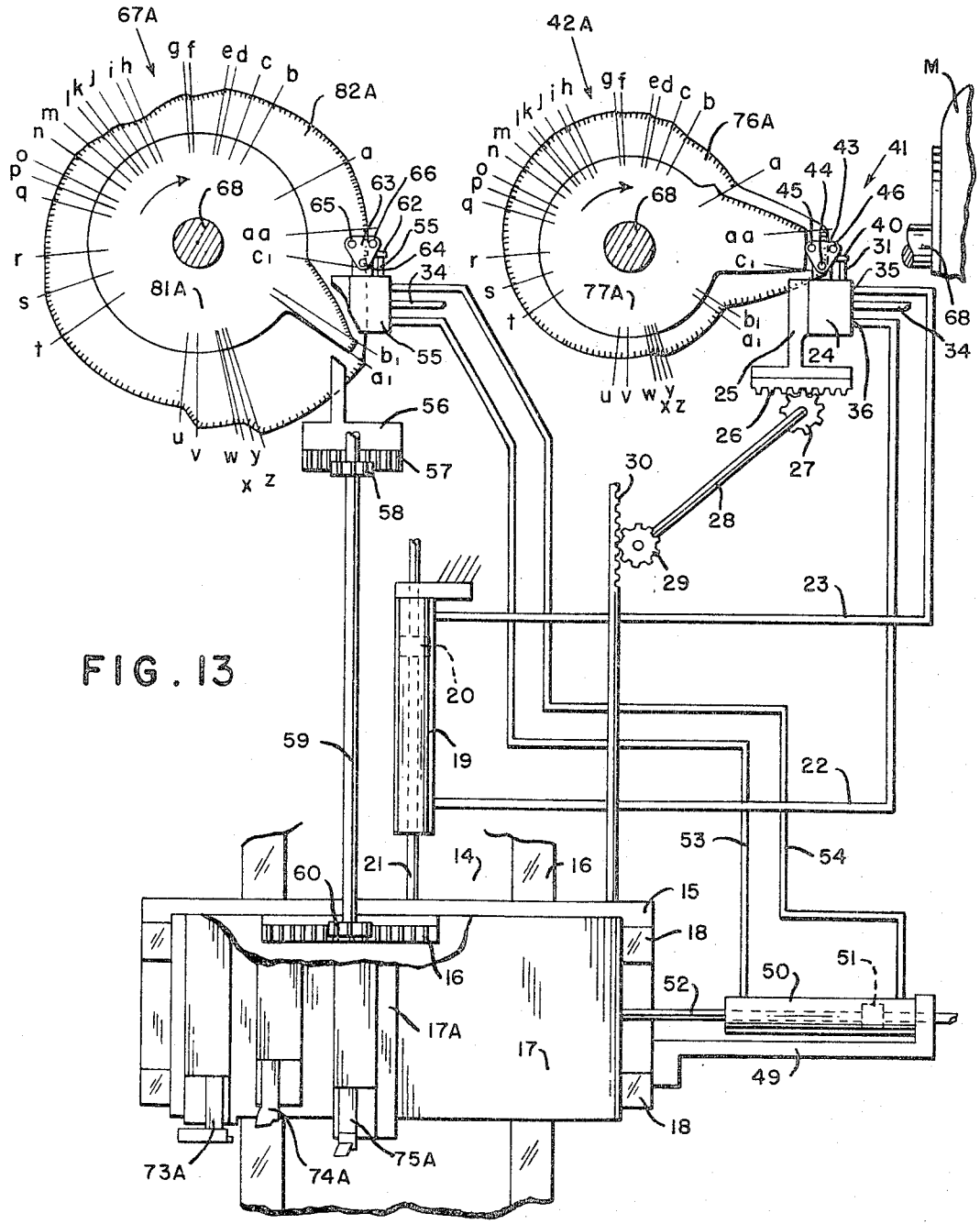

FIGS. 4–7, inclusive, discloses a modified form of template means;

FIG. 8 is a modified form of the invention in which rotary hydraulic means is employed to move the saddle and slide;

FIG. 9 is still another modified form of the invention in which two four-way valve means are employed instead of one as disclosed in FIG. 1;

FIG. 10 is a view similar to FIG. 9, except that a rotary hydraulic motor is employed for a linear hydraulic motor;

FIG. 11 is a section taken substantially along line 11—11 of FIG. 9;

FIG. 12 is a view similar to FIG. 1 in which a different set of tools is shown for fabricating a workpiece different from that shown in FIG. 1; and FIG. 13 is a view similar to FIG. 2, with template means different from that shown in FIG. 2.

Referring to the drawings, and particularly to FIGS. 1 to 3, the principles of the invention are shown as applied to a machine tool including a rotatable work-supporting table 10 (FIG. 1) mounted within a base 11 for rotation by a conventional headstock transmission (not shown). The table 10 may support a work holding fixture 12 within which a workpiece 13 is rigidly mounted and upon which turning and facing operations are to be performed, all in a predetermined cycle of operations.

The base 11 may include a portion 14 extending upwardly behind table 10 (FIG. 2) and it may support a saddle 15 mounted for vertical sliding movement along ways 16 on the machine base portion 14. A tool slide 17 may be mounted for horizontal sliding movement along ways 18 on saddle 15.

Referring to FIG. 2, a cylinder 19, fixed to the portion 14, may have a piston 20 therein, the piston rod 21 of which is connected to saddle 15. Fluid transmission lines 22 and 23 may connect opposite ends of cylinder 19 to a valve body 24 that is mounted on a horizontally reciprocable bracket 25 having a rack 26 thereon that meshes with a gear 27 fixed to one end of a shaft 28. Another gear 29 fixed to shaft 28 meshes with a vertical rack 30 that is fixed to the saddle 15.

Referring to FIG. 3, the valve body 24 includes an axially movable spool 31 having disks 32 and 33 spaced therealong on each side of an inlet port 34. A port 35 in valve body 24 leads to line 23, and a port 36 leads to line 22. Exhaust lines 37 and 38 lead from body 24. A spring 39 normally urges spool 31 upwardly against a lever 40 forming part of a double roll stylus 41 that engages the peripheral surfaces of a template assembly 42, all as will be more fully described later.

The design of the valve body 24 and spool 31 is such that very sharp and accurately located edges are provided on the disks 32, 33, and the ports 35 through 38 are precisely related so that any axial movement of spool 31 on either side of a central or null position will introduce pressure fluid into one end of cylinder 19 while exhausting the other end.

The double roll stylus 41 may include a triangularly shaped plate 43 pivoted at one of its apices 44 on valve body 24. The other two apices 45 and 46 support rollers 47 and 48. Lever 40 is integral with plate 43 and is arranged such that it is at exactly right angles to the longitudinal axis of spool 31 when the spool is in its null position.

From the foregoing it is evident that spool 31 is urged upwardly by spring 39 and tends to move plate 43 counterclockwise about pivot point 44 until rollers 47 and/or 48 contact the peripheral edge of template means 42. At the beginning of a cycle of operations, the peripheral edge of template means 42 will be such as to maintain lever 40 and spool 31 in their null positions. As template means 42 is rotated counterclockwise, any point on its peripheral edge that tends to move away from roller 48 will permit spool 31 to rise, admitting pressure fluid to line 23, forcing piston 20 and saddle 15 with it vertically downward. Accordingly, rack 30 moves downwardly, effecting horizontal movement of bracket 25 leftwardly while maintaining roller 48 in contact with template means 42 and forcing lever 40 and spool 31 into their null positions. Thus, rack 30, pinions 27, 29 and horizontally slidable rack 26 provide a feedback means which with valve body 24 and template means 42 provides a servo control over the vertical movement of saddle 15. Regardless of the forces resisting the movement of saddle 15, the forces between the template means 42 and valve spool 31 will always be independent thereof and of substantially zero value.

Conversely, action of template means 42 on roller 47 moving it clockwise about pivot 44 will depress spool 31 against the action of spring 39. Movement of spool 31 downwardly admits pressure fluid into line 22 while exhausting line 23, thereby forcing piston 20 and saddle 15 upwardly. The upward movement of saddle 15 moves valve body 24 rightwardly through the action of the feedback 30, 29, 27 and 26 until the null position of spool 31 is achieved.

A bracket 49 may be attached to saddle 15 for vertical movement therewith. It may support a cylinder 50 having a piston 51 therein, the rod 52 of which is connected to tool slide 17. Lines 53 and 54 lead from opposite ends of cylinder 50 to a valve body 55 identical with valve body 24. Valve body 55 is mounted on a horizontally reciprocable bracket 56 having a rack 57 that meshes with a pinion 58 splined to a shaft 59. Shaft 59 has a gear 60 fixed to it that meshes with a rack 61 integrally attached to tool slide 17.

The valve body 55 includes a spool 55′ identical with spool 31 of valve body 24 and it is axially moved by a lever 62 forming part of plate 63 that is pivoted at 64 on valve body 55. Pate 63 includes rollers 65 and 66 mounted thereon in a manner similar to the mounting of rollers 47 and 48 on plate 43. Another template means 67 is provided for actuating plate 63 in the same way that template means 42 actuates plate 43.

Thus, at the beginning of a cycle of operations, the template means 67 maintains the spool 55′ of valve body 55 in its null position. Counterclockwise movement of plate 63 permits spool 55′ to move upwardly, causing pressure fluid to flow into the right-hand end of cylinder 50 while exhausting the left-hand end, thus moving piston 51 and tool slide 17 leftwardly. The feedback means 57, 58, 59, 60 and 61 return spool 55′ to its null position. Additionally, movement of plate 63 clockwise causes pressure fluid to flow into the left-hand end of cylinder 50, moving piston 51 and tool slide 17 rightwardly; and the feedback means above referred to returns spool 55′ to its null position.

The template means 42 and 67 are fixed to a shaft 68 that is rotated in a counterclockwise direction and has a worm gear 69 fixed thereto that meshes with a worm 70 that is shown as geared through pinion 71 to a large gear 72. The shaft 68 may be journaled in bearings mounted on the portion 14 of base 11.

Referring again to FIG. 1, a workpiece 13 is shown held in the fixture 12. The workpiece is to have its internal surface turned along a bevel from B to C; turned from C to D; another bevel produced from D to E; turned from E to F; faced from F to G; another turning from K to L; a facing from L to M; a turning from M to N; beveled from N to O; and finally turned from P to Q. These operations, in the present embodiment, are to be performed in a cycle by tools 73, 74 and 75, all mounted on the tool slide 17. The horizontal spacing of tools 73, 74 and 75 on slide 17 is dictated by the dimensions of the workpiece 13 and the operations to be performed by each tool. In the embodiment disclosed, tool 73 is employed to produce all surfaces between points A to G, inclusive; tool 75 is used to machine surfaces from K through O; and tool 74 is used only to turn the surface P to Q.

Obviously, tool 74 must be spaced horizontally from tool 73 so that during its cutting operation, tool 74 will clear and ride on the right-hand side of fixture 12. Furthermore, tool 75 is spaced horizontally from tool 74 so that when the former is machining surfaces M to N, tool 74 will be to the left of surface P to Q.

The position of the cutting points of tools 73, 74 and 75 vertically downward from the bottom end of slide 17 is determined by the amount of overhang necessary to permit required vertical motion without interference between the workpiece and tool slide and between the workpiece and tool tips.

Initially, the locations of the cutting tips of tools 73, 74 and 75 are laid out from the dimensions of the workpiece and the best path of movement of the tool slide 17 to produce the various machining operations in a programmed cycle. Thus, in the example shown, the path of travel of the tool slide 17 has been determined so that the cutting point of tool 73 follows the path A–B–C–D–E–F–G–H–J–K–L–M–N–O–P–Q–R–A.

The template means 42 is then designed so that its polar coordinates are proportional to corresponding coordinates along the vertical axis of motion of slide 17 to effect the above-referred-to path of movement of tool 73. And, the template means 67 is designed so that its polar coordinates are proportional to corresponding coordinates along the horizontal axis of motion of tool slide 17 to effect said path of movement.

It is felt that the design and construction of the template means 42 and 67 can best be understood by describing the cycle of operations performed on the workpiece 13. Having made the tool layout and a layout of the path of travel of the tool slide 17 as previously explained, it becomes relatively simple to calculate the time required for each motion along said path at a desired rate of feed for the material being machined and at desired traverse rates. A total of these individual times represents the time for the complete cycle and provides the data from which the polar coordinates of the template means can be calculated. Since template means 42 and 67 are fixed relative to each other and are rotated through 360° to complete a program, the distance between each point A, B, C, etc., about the path can be represented by a corresponding distance between corresponding points A, B, C, etc., about the template means 42 and 67. Futhermore, the rate of movement between succeeding points A, B, C, etc., about template means 42 and 67 will be the slope of the effective template surface between said points. Expressed otherwise, it is the rate of change of radial distance between two succeeding points. Thus, it is apparent that the angular position of each point about the template is a time dimension, and the corresponding radial dimension is a linear dimension, characterizing the templates of this invention as having linear distance as well as time dimensions embodied therein as distinguished from known tracer templates which involve only linear distance dimensions.

The geometry of the plates 43 and 63 and the construction of template means 42 and 67 are of considerable importance in the present invention. The template means 42 and 67 are composite template means, i.e., template means 42 comprises two components that are located in spaced parallel planes. Thus, composite template means 42 includes a template component 76, the peripheral edge of which is aligned and cooperates with the roller 48. It also includes another template component 77, the peripheral edge of which is aligned and cooperates with roller 47. In the embodiment disclosed, the component 76 is employed to control vertically downward movements of the saddle 15 and with it, slide 17, while component 77 is employed to control vertically upward movements of saddle 15 and with it, slide 17 as well as periods of dwell of saddle 15 in its vertical movement, which latter are produced by simply employing arcuate peripheral portions of component 77 having the center of said arcuate portions at the axis of shaft 68.

Referring again to FIG. 3, it is evident that with the composite template means 42 rotating in a counterclockwise direction, downward movement of saddle 15 is controlled by a surface on template component 76, the slope of which is shown as dot-and-dash line 78, cooperating with roller 48, and the velocity of movement of saddle 15 will depend upon the slope of line 78. It is to be noted that the slope of line 78 may be any place within the first and third quadrants and any angle between a vertical and a horizontal line, the former providing no downward movement of saddle 15 as template means 42 rotates counterclockwise, and the latter theoretically providing infinite speed. However, any angle less than horizontal would provide a finite rapid rate of movement of saddle 15, and any angle between vertical and horizontal would be effective without interfering with the proper functioning of the plate 43.

Upward movement of saddle 15 is controlled by a surface of template component 77, the slope of which is shown as dot-and-dash line 79, cooperating with roller 47. The velocity of upward movement of saddle 15 will depend upon the slope of line 79, and it may be any place within the second and fourth quadrants and any angle between vertical such as line 80 which is an arcuate line having its center at the axis of shaft 68 and which provides a period of dwell with no upward movement of saddle 15, or it may be horizontal which would again provide a theoretically infinite speed of saddle 15.

In a similar fashion, the template means 67 may comprise a component 81, the peripheral edge of which is aligned and cooperates with the roller 65. It also includes another template component 82, the peripheral edge of which is aligned and cooperates with roller 66. The component 81 is employed to control horizontal rightward movement of slide 17 as well as periods of dwell, while the component 82 is employed to control horizontal leftward movement of the slide 17. The rollers 65 and 66 on plate 63 cooperate with the slope of the various portions of the template components 71 and 82 in the same manner that the rollers 47 and 48 cooperate with template components 76 and 77.

Referring to FIG. 2, with the parts in the condition shown, the point on the periphery of template component 76 along the line A acts on roller 48, holding spool 31 in its null position, while roller 47 is ineffective. Template component 81 is acting on roller 65, holding spool 55′ in its null position, while roller 66 is ineffective; and the cutting point of tool 73 is at point A (FIG. 1).

As the combined template means 42 and 67 rotate in a counterclockwise direction to point B, the roller 65 follows along a circular surface of template segment 81 having its center at the axis of rotation of shaft 68. Consequently, tool slide 17 is prevented from horizontal motion. However, during this rotation of template means 42, roller 48 follows the surface on template component 76 between points A and B which has a relatively rapid change of slope, providing a rapid traverse movement of saddle 15 vertically downwardly until the cutting point of tool 73 is at point B. In the embodiment disclosed, no cutting occurs until the cutting point of tool 73 reaches point B, at which point a slow feeding operation from B to C (FIG. 1) is effected. In order to provide a transition from rapid traverse to a slow feed rate downwardly, a curved, deceleration surface 83 on template component 76 is provided at point B. This curved surface 83 acts to decelerate the traverse motion so that no abrupt disruptive action will occur in changing from a rapid traverse to a slow feed motion.

In moving template means 42, 67 from point B to point C, the rate of change of slope of template component 76 is slight and such as to produce a vertically downward movement of saddle 15. Since the velocity of saddle 15 is determined by this slope, a relatively slow feed rate of movement of saddle 15 occurs. Also, the slope of the template surface from B to C on template component 81 is likewise slight, and such that it acts on roller 65 to move spool 55' downwardly, thereby producing a rightward movement of tool slide 17. The simultaneous action of rollers 48 and 65 in the moving of template means 42 and 67 from B to C causes slide 17 simultaneously to move rightwardly and downwardly, producing a resultant motion from B to C on the path of travel of tool 73.

Continued counterclockwise movement of template means 42, 67 between points C and D thereon presents a circular (effective) portion on template component 81 which cooperates with roller 65 and retains the tool slide 17 from horizontal motion, while the portion C to D on template component 76 acts on roller 48 to effect a downward movement of saddle 15 until the cutting point of tool 73 reaches point D, whereupon component 81 acts on roller 65 simultaneously with component 76 acting on roller 46 to produce the beveled surface between points D and E of the path of movement of tool 73.

Template component 81 between its points E to F follows a circular path with its center at the axis of shaft 68, thus preventing horizontal movement of tool slide 17. The portion of component 76 between its points E–F is a curve of progressively diminishing radii, causing spool 31 to move upwardly, thereby causing saddle 15 to move downwardly at a feed rate determined by the rate at which the radii diminish over the extent of the portion E to F of component 76.

Portion F to G on component 77 is circular with its center at the axis of shaft 68. The action of roller 47 on this circular portion prevents saddle 15 from moving vertically. The portion F to G on component 81 is along a line that acts on roller 65, forcing spool 55' downwardly, thereby effecting rightward movement of tool slide 17 until tool 73 is at point G in its path of travel.

From G to H on component 81 the curve is circular with its center on the axis of shaft 68, preventing horizontal movement of tool slide 17. The portion G to H on component 77 is an angular line having a slope with a rapid rate of change which cooperates with roller 47. In order to prevent instant increase in speed from feed between F and G to rapid traverse between G and H, an acceleration curve 84 is located at the transitional point between these two portions. The portion between G and H on component 77 forces spool 31 downwardly and hence causes saddle 15 to move vertically upwardly at a traverse rate, while slide 17 is restrained from horizontal movement until the point of tool 73 is at point H in its path of travel. When the cutting point of tool 73 is at point H, the cutting tips of tools 74 and 75 are above the top of the workpiece 13.

The portion H to J on template component 77 is circular with its radius center on the axis of shaft 68, cooperating with roller 47 and preventing vertical motion of saddle 15. The portion H to J on template component 82 provides a rapid rate of change and cooperates with roller 66, permitting spool 55' to rise, hence effecting horizontal traverse of slide 17 leftwardly until the point of tool 73 is at point J. Since the portion G to H on component 81 was circular, and portion H to J on component 82 is a rapid traverse slope, an accelerating curved portion 85 is provided at the beginning of this traverse motion. This traverse motion positions tool 74 above the bore in the internal hub of workpiece 13, and locates tool 75 in position to machine the outer periphery of said hub.

The J to K portion of template component 81 is circular with its radius center on the axis of shaft 68, thereby preventing horizontal movement of tool slide 17. Accordingly, a deceleration curve 86 is provided at the end of portion H to J on component 82. The portion J to K on template component 76 is a rapidly changing sloped line. It cooperates with roller 48, causing spool 40 to rise, effecting vertically downward movement of saddle 15 until the point of tool 73 is at point K in its path of travel. This locates the cutting tip of tool 75 at point K for turning the O.D. of the internal hub of the workpiece 13, and locates tool 74 over the bore of said hub with its cutting tip to the left of, and clearing the bore wall.

The portion K to L on template component 81 is circular with a radius on the axis of shaft 68, preventing horizontal movement of tool slide 17. The portion K to L on template component 76 is a relatively steeply inclined surface cooperating with roller 48 to permit spool 31 to rise, effecting a relatively fast downward movement of saddle 15 until the cutting tip of tool 75 arrives at point L in its path of travel. This is possible since the surface from K to L on workpiece 13 is a non-critical surface and can be machined rapidly.

The L to M portion of template component 77 is circular, having its center on the axis of shaft 68, preventing the vertical movement of saddle 15. The L to M portion of template component 81 is a rise acting on roller 65 to effect rightward movement of tool slide 17 until the tip of tool 75 is at point M.

The M to N portion of template component 81 is circular with a radius on the axis of shaft 68 so that tool slide 17 is prevented from horizontal movement. The portion M to N on template component 76 cooperates with roller 48, permitting spool 31 to rise and moving saddle 15 downwardly until the tip of tool 75 reaches point N.

The portions N to O on template components 76 and 82 cooperate with rollers 48 and 66, respectively, to produce feed rates which combine to give the bevel N to O in the path of travel of tool 75. This places the cutting point of tool 74 at point O within the confines of the bore of the hub of workpiece 13. The portion O to P on template component 77 is circular with a radius on the axis of shaft 68, preventing vertical movement of saddle 15. The portion O to P on template component 81 has a rapid rate of change of slope and operates roller 65 to effect rightward movement of tool slide 17 at traverse rate until the tip of tool 74 is at point P within the hub bore.

The portion P to Q on template component 81 is circular with its center on the axis of shaft 68, preventing horizontal movement of tool slide 17. The portion P to Q on template component 77 has a slight rate of change of slope such that it cooperates with roller 47, forcing spool 31 downwardly, causing saddle 15 to move upwardly at a feed rate until it reaches point Q in its path of travel.

The Q to R portion of template component 81 is circular having its center on the axis of shaft 68, thereby preventing horizontal movement of slide 17. The Q to R portion on template component 77 traverses saddle 15 upwardly to point R in the path of travel of tool 73.

The portion R to S of both template components 77 and 81 act on rollers 47 and 65, simultaneously forcing spools 31 and 55' downwardly, thereby effecting simultaneous movement of tool slide 17 rightwardly and saddle 15 upwardly until the cutting tip of tool 73 is at point A and tools 74 and 75 are in the position shown in FIG. 1.

The portion of template components 77 and 81 between S and A is circular, preventing movement of tool slide 17 or saddle 15. At this point, the cycle is completed, the driving means for template means 42 and 67 is de-energized, the finished workpiece 13 is replaced by an unmachined piece, and the cycle is repeated.

From the foregoing it is evident that critical dimensions on the workpiece are held by the rollers on the styluses 63 and 41 acting on circular paths on the template components. Since circular paths can be precisely ground, no problem is presented in holding accurate sizes. Furthermore, the generation of curves of varying rates of slope between succeeding points on the template need not be precise, since slight variations therein merely change the rate of feed or traverse slightly. Additionally, with the double roller stylus principle and the template components for each of the template means 67 and 42, overlapping of surfaces between the template components may be used to ensure position control of the styluses at all times.

As was previously described in connection with FIG. 3, the effective peripheral portion of the template means 42 acts on rollers 48 and 47, depending upon whether the effective portion is along a line lying in the first and third quadrants, or in the second and fourth quadrants, respectively. Such an arrangement requires providing clearance on the non-effective portion of the template means so that it will not interfere with the non-effective roller 48 or 47 as the case may be. This requires the production of template components 76 and 77 of substantially different contour and consequently they are more time-consuming in preparing. The same applies to the components 81 and 82.

It has been found that the clearance feature can be applied to non-rotary styluses and in so doing, the template means may be composed of components of identical contour, one being of a different size than the other by an amount equal to the distance between the two styluses.

Referring to FIGS. 4 to 7, inclusive, and particularly to FIGS. 6 and 7, the plate 43 is shown as provided with two non-rotatable styluses 90 and 91 spaced apart the same distance that styluses 47 and 48 are spaced in FIG. 2. The effective portion of stylus 90 (FIG. 6) lies in the second quadrant. And, stylus 91 includes an effective portion 93 lying in the third quadrant. The remainder of the styluses 90 and 91 is relieved to provide clearance as will be explained.

Since both components 94 and 95 of the template means 96 corresponding to template means 42 (FIG. 2) have peripheral surfaces of identical contour, the lines 97 and 98 (FIG. 6) represent corresponding portions on 94 and 95 that lie in the first and third quadrants. It is apparent from FIG. 6 that the line 97 is in active position with stylus quadrant 92, and that line 98 lies within the clearance portion of the stylus 91. This same condition will prevail for all lines 97, 98 between vertical and horizontal so long as they lie within the first and third quadrants.

In a similar fashion, lines 99 and 100 represent corresponding portions on components 94 and 95 that lie in the second and fourth quadrants. It is apparent from FIG. 6 that line 99 is in active position with quadrant 93 of stylus 91; and that line 100 lies within the clearance portion of stylus 90. This same condition will prevail for all lines 99 and 100 between vertical and horizontal so long as they are within the second and fourth quadrants.

Referring to FIG. 5, the plate 63 corresponding to the plate 63 of FIG. 2 is provided with styluses 90′, 91′ having an effective quadrant 101′ similar to quadrant 92; and a stylus having an effective quadrant 102′ similar to quadrant 93 of FIG. 6.

From the foregoing it is evident that as the components 94, 95 and 101, 102 rotate together in a counter-clockwise direction, the cycle of operations produced by them will be identical to that produced by components 76, 77; and 81, 82 of FIG. 2. Furthermore, since the components 94, 95 have the exact same contour, but of a different size, their manufacture will be substantially easier than the manufacture of dissimilar components such as 76, 77.

Referring to FIGS. 8 to 11, inclusive, certain modified forms of the invention are shown. Thus, in FIG. 8, cylinder 19 and piston 20 have been replaced by a reversible hydraulic motor 103, the output shaft of which has fixed to it a worm 104 that meshes with a worm gear 105. The gear 105 is permitted to rotate but is restrained against axial movement. Gear 105 is threaded onto a rod 106 that is fixed to saddle 15. A similar arrangement may be provided for slide 17, FIG. 2 (not shown in FIG. 8).

In FIG. 9, an additional four-way valve 107 may be located between valve 24 and cylinder 19. Referring to FIG. 11, the valve 107 is shown as including a stem 108 slidingly supporting pistons 109, 110 at each end thereof. Constant pressure from lines 111, 112 forces pistons 109, 110 in opposite directions, maintaining spools 113, 114 in the position shown in FIG. 11. Raising of lever 40 of valve 24 causes pressure fluid from line 34 to enter line 23, forcing piston 109 and stem 108 leftwardly since the fluid also acts on the end of stem 108. Piston 110, however, remains in its rightward position. This admits pressure fluid from a line 115 to line 23′, causing piston 20 to move downwardly, and with it, saddle 15.

Movement of lever 40 downwardly admits pressure fluid to line 22, forcing piston 110 and stem 108 rightwardly, admitting pressure fluid from line 115 to line 22′ which moves piston 20 upwardly and with it, saddle 15. There may be another auxiliary or supplementary valve 107 within the hydraulic circuit for the slide 17 between valve 55 and cylinder 50 (FIG. 2). This arrangement makes it possible to use any high pressure fluid from line 115 and still use a relatively low pressure fluid in line 34 to thereby reduce to a minimum the force of the styluses against the template components.

In FIG. 10, the cylinder 19 and piston 20 of FIG. 9 have been replaced by the hydraulic rotary motor 103, while the supplementary four-way valve 107 is still retained.

Referring to FIGS. 12 and 13, a workpiece 13A is shown requiring twenty nine different movements of the plate 17A along rectilinear, intersecting paths, which plate supports tools 73A, 74A and 75A arranged, for workpiece 13A, in the same manner that tools 73, 74 and 75 are arranged for the piece 13 (FIG. 1).

In the embodiment shown in FIGS. 12 and 13, all of the polar coordinates except those for one movement in a vertical direction are located on the component 76A of composite template 42A. Thus, the polar coordinates for feed up, feed down, traverse up, and dwell are all located on component 76A. And, only the polar coordinates for traverse down are located on the component 77A.

In a similar vein, the polar coordinates for feed right, feed left, traverse right, and dwell are all located on the component 82A of the composite template 67A; and, only the traverse left polar coordinates are located on the component 81A.

The arrangement shown in FIGS. 12 and 13 is primarily intended to show the flexibility of the manner in which the polar coordinates can be applied to the various components of the composite template means for various workpieces.

Since a specific step-by-step description has been given of the movements of the tool support 17 of FIG. 3 by the rotation of the template means 42 and 67 to produce the workpiece 13, it is believed unnecessary to give such a description for the workpiece 13A. It is to be noted, however, that in the embodiment shown in FIGS. 12 and 13, the composite templates 42A and 67A rotate clockwise, whereas in FIG. 3, the template means 42 and 67 are shown rotating in a counterclockwise direction.

Although the various features of the improved program control have been shown and described in detail to fully disclose several embodiments of the invention, it will be evident that changes may be made in such details and certain features may be used without others without departing from the principles of the invention.

What is claimed is:

1. A rotatable composite template for controlling the movement of a member along rectilinear intersecting paths comprising a rotatable member having a plurality of separate stylus engaging surfaces formed thereon defining a plurality of separate template components disposed in closely spaced parallel relation and including a pair of template components for each of said rectilinear paths, each of said pairs of components having cooperatively related stylus engaging surfaces defined by polar coordinates proportional to axis coordinates of the desired movement of said member along one of said rectilinear paths, the stylus engaging surfaces of the separate components of each said pair having effective portions defined by the corresponding axis coordinates of said member for movement in oposite directions along the respective rectilinear path, each said pair of stylus engaging surfaces having a predetermined substantially uniform radial spacing therebetween at predetermined polar coordinates defining the end points of the effective portions thereof whereby said pair of surfaces is adapted to be simultaneously engaged by a pair of stylus members symmetrically mounted on a single stylus support at said predetermined polar coordinates, said stylus engaging surfaces being disposed (and means for supporting all of said components with the stylus engaging surfaces thereof disposed in spaced parallel relation and) in fixed angular position relative to each other such that the polar coordinates of the respective components are correlated to produce the desired movement of said member along said rectilinear intersecting paths.

2. The rotatable template set forth in claim 1 wherein the effective portions of the stylus engaging surface of one component of each of said pairs is defined by the corresponding axis coordinates of said member for traverse in one direction, feed in both directions and dwell and of the other component of each of said pairs for traverse in the opposite direction along the respective rectilinear paths.

3. A method of making a rotatable composite template for controlling the movement of a member along rectilinear intersecting paths comprising the steps of forming a plurality of separate stylus engaging surfaces on a rotatable member in closely spaced parallel relation to define a plurality of separate template components including a pair of template components for each of said rectilinear paths, providing cooperatively related pairs of stylus engaging surfaces on immediately adjacent components defined by polar coordinates proportional to corresponding axis coordinates of the desired movement of said member along one of said rectilinear paths with the stylus engaging surfaces of the separate components of each pair having effective portions defined by the corresponding axis coordinates of said member for movement in opposite direction along the respective rectilinear path, spacing each said pair of stylus engaging surfaces a predetermined substantially uniform radial distance apart at predetermined polar coordinates defining end points of the effective portions thereof whereby said pair of surfaces is adapted to be simultaneously engaged by a pair of stylus members symmetrically mounted on a single stylus support at said predetermined polar coordinates, and positioning said components (adjacent to one another in closely spaced parallel relation, and integrally connecting all of said components) in a predetermined fixed angular relation such that the polar coordinates of the respective components are correlated to produce the desired movement of said member along said rectilinear intersecting paths.

4. The method set forth in claim 3 wherein the effective portions of the stylus engaging surface of one component of each of said pairs is defined by the corresponding axis coordinates of said member for traverse in one direction, feed in both directions and dwell and of the other component of each of said pairs of traverse in the opposite direction along the respective rectilinear paths.

References Cited

UNITED STATES PATENTS

| | | | |
|---|---|---|---|
| 1,386,332 | 8/1921 | Hendrickson | 33—18 |
| 1,883,204 | 10/1932 | Whitaker | 33—18 |

FOREIGN PATENTS

| | | |
|---|---|---|
| 173,628 | 1/1922 | Great Britain. |

HARRY N. HAROIAN, *Primary Examiner.*

LEONARD FORMAN, *Assistant Examiner.*

UNITED STATES PATENT OFFICE
CERTIFICATE OF CORRECTION

Patent No. 3,346,961                                      October 17, 1967

Edward P. Bullard III

It is hereby certified that error appears in the above numbered patent requiring correction and that the said Letters Patent should read as corrected below.

Column 2, line 17, for "and", second occurrence, read -- the --; column 4, line 55, for "Pate" read -- Plate --; column 6, line 60, for "71" read -- 81 --; column 11, lines 37 to 39, strike out "(and means for supporting all of said components with the stylus engaging surfaces thereof disposed in spaced parallel relation and)"; column 12, line 16, for "direction" read -- directions --; lines 24 to 26, strike out "(adjacent to one another in closely spaced parallel relation, and integrally connecting all of said components)"; line 36, for "of" read -- for --.

Signed and sealed this 19th day of November 1968.

(SEAL)
Attest:

EDWARD M. FLETCHER, JR.                        EDWARD J. BRENNER
Attesting Officer                                  Commissioner of Patents